US006284314B1

(12) United States Patent
Kato et al.

(10) Patent No.: US 6,284,314 B1
(45) Date of Patent: Sep. 4, 2001

(54) POROUS CERAMIC THIN FILM AND METHOD FOR PRODUCTION THEREOF

(75) Inventors: Kazumi Kato, Aichi-ken; Hiroshi Taoda, Nagoya, both of (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 08/351,697

(22) Filed: Dec. 8, 1994

(30) Foreign Application Priority Data

| Dec. 9, 1993 | (JP) | 5-341562 |
|---|---|---|
| Dec. 9, 1993 | (JP) | 5-341563 |

(51) Int. Cl.$^7$ ...................................................... B05D 5/00
(52) U.S. Cl. ...................... 427/245; 427/376.2; 427/384
(58) Field of Search ................................ 427/245, 376.2, 427/384

(56) References Cited

U.S. PATENT DOCUMENTS

| 4,814,202 | * | 3/1989 | Castelos | 427/226 |
| 5,009,688 | * | 4/1991 | Nakanishi | 65/18.3 |
| 5,137,634 | * | 8/1992 | Butler et al. | 210/490 |
| 5,304,533 | * | 4/1994 | Kobayashi et al. | 505/440 |

FOREIGN PATENT DOCUMENTS

| 2-500258 | 2/1990 | (JP) . |
| 5-96180 | 4/1993 | (JP) . |

OTHER PUBLICATIONS

Yi et al., "Sol–Gel Processing at loplex oxide Films," Ceremic Bulletin vol. 70 No. 7 (1991) pp. 1173–1179.*

Teruaki Hisanaga, et al., Industrial Water, vo. 379, pp. 11–14, 1990.

H. Hidaka, et al., "Photocatalytic Degradation of the Hydrophobic Pesticide Permethrin in Fluor o Surfactant/TiO2 Aqueous Dispersions", Chemosphere, vol. 25, No. 11,pp. 1589–1597, 1992.

A.L. Pruden, et al., Journal of Catalysis, vol. 82, 1983, pp. 404–417.

Konosuke Nishida "Encyclopedia", Heibonsha, vol. 1, pp. 136–137, 1984.

Hiroaki Yanagida, "Science of Ceramics", Gihodo, 1981, pp. 108–111.

* cited by examiner

*Primary Examiner*—Benjamin L. Utech
(74) *Attorney, Agent, or Firm*—Oblon, Spivak, McClelland, Maier & Neustadt, P.C.

(57) ABSTRACT

A porous ceramic film having micropores of uniform diameter is formed on a substrate by depositing on the substrate a layer of a ceramic sol containing polyethylene glycol or polyethylene oxide and then heating the substrate. This porous ceramic film is used as a catalyst or catalyst support. When the ceramic of this film is titanium oxide, the film is particularly useful as a photocatalyst for the decomposition of harmful and malodorous substances.

13 Claims, No Drawings

POROUS CERAMIC THIN FILM AND METHOD FOR PRODUCTION THEREOF

BACKGROUND OF THE INVENTION

1. Field of the Invention

This invention relates to a porous ceramic thin film having pores of uniform in diameter in the surface and a method for the production thereof.

Porous ceramic thin films are used in numerous products such as catalysts, catalyst supports, adsorbent materials, deodorants, deodorizing materials, and slow release materials.

2. Description of the Prior Art

As ceramic materials containing voids and pores, namely porous ceramic materials, there are known: 1) internal micropore-containing powders such as of zeolite and silica gel, 2) sintered materials such as of alumina ceramic and glass filter produced by sintering powders containing micropores, 3) porous glass produced by chemically treating or boring glass, 4) fibrous aggregates such as glass fibers and potassium titanate fibers, and 5) foams such as foam glass and cellular concrete [Hiroaki Yanagida: "Science of Ceramics", published by Gihodo, p. 109 (1981)]. These ceramic materials are invariably in a bulky state. Heretofore, it has been very difficult to produce a porous ceramic film, particularly a porous thin film. It has been virtually impossible to produce a porous thin film containing pores of a uniform diameter. Such methods as PVD, CVD, and sputtering and a method for anodic oxidation of metals have been available for the production of porous ceramic materials. These methods are at a disadvantage in being expensive to implement, incurring difficulty in obtaining products with large surface areas, encountering difficulty in controlling micropores, and limiting the metals usable as raw materials and consequently limiting the ceramic materials produced.

If porous ceramic thin films containing micropores of a uniform desired diameter can be easily produced, it will be possible to use them for efficient adsorption of substances that have offensive odors or pollute the environment. This can be achieved by adjusting the size of the micropores of the porous ceramic thin film to conform to the size of the particles of the substance to be adsorbed.

For the removal of a substance that possesses an offensive odor or pollutes the environment, the practice has been to absorb or adsorb the substance using a liquid absorbent such as an acid or an alkali, an adsorbent agent, or soil. This method, however, requires disposal of a liquid waste or the used adsorbent agent or soil and, therefore, not only is troublesome but may also cause secondary environmental pollution. A method which masks offensive odors with an aromatic and a method which decomposes malodorous substances with activated sludge or ozone are also conceivable. The method using an aromatic has the problem that the smell of the aromatic itself may cause pollution, the method using activated sludge has the problems of low treatment capacity and inevitable diffusion of the smell of sludge, and the method using ozone has problems deriving from the harmful nature and high cost of ozone [Konosuke Nishida: "Encyclopedia", published by Heibonsha, Vol. 1, p. 136 (1984)].

It is known that when ceramic materials are semiconductors, they manifest special effects. Specifically, when a ceramic semiconductor is irradiated with light, it generates electrons having a strong reducing activity and positive holes having a strong oxidizing activity and causes molecules which contact it to be decomposed by the oxidizing-reducing activity. By harnessing this photocatalytic activity of the ceramic semiconductor, organic solvents dissolved in water, such substances as agricultural pesticides and surfactants which pollute the environment, and noxious substances in the air can be removed by decomposition. This method utilizes exclusively a ceramic semiconductor and light. It has an advantage over biotic treatment methods using microorganisms in that it is less restricted by such reaction conditions as temperature, pH, gaseous atmosphere, and toxicity. Moreover, it enables organic halogen compounds and organic phosphorus compounds, which are not easily treated by biotic methods, to be easily decomposed and removed. The studies performed to date regarding the removal of organic substances by photocatalytic decomposition have used photocatalysts in the form of powder [as reported in A. L. Pruden and D. F. Ollis, Journal of Catalysis, Vol. 82, 404 (1983), H. Hidaka, H. Jou, K. Nohara, J. Zhao, Chemosphere, Vol. 25, 1589 (1992), Teruaki Hisanaga, Kenji Harada, and Keiichi Tanaka, Industrial Water, Vol. 379, 11 (1990), for example]. These photocatalysts are difficult to handle or use. In the treatment of water, the treated water must be filtered to recover the photocatalyst powder entrained therein. Since the photocatalyst is a fine powder, it is not easily separated by filtration because it clogs the filter. The treatment of water, therefore, cannot be carried out continuously because the recovery of the used photocatalyst from the treated water is difficult. The development of a porous thin film, i.e. a photocatalyst (ceramic semiconductor), which is easy to manufacture will enable continuous adsorption and decomposition of harmful substances to be conducted and efficiently on a maintenance-free basis.

Among the various kinds of porous ceramic thin films, there is a particularly strong need for one having micropores of uniform diameter. Further, a need has arisen for a photocatalyst that is free from the problems mentioned above. The present inventors continued a study with a view to meeting these needs. This invention has been accomplished as a result.

SUMMARY OF THE INVENTION

Specifically, this invention is directed to a method for the production of a porous ceramic thin film, which comprises depositing a ceramic sol containing at least one member selected from the group consisting of polyethylene glycol and polyethylene oxide in the form of a film on a substrate and then heating the substrate for firing the film and producing on the substrate a porous ceramic film having micropores of uniform diameter and to a porous ceramic thin film produced by this method.

A porous titania thin film produced by this method is characterized by having micropores of uniform diameter in the surface thereof, by, as a result of the oxidizing-reducing activity of electrons and positive holes formed when the thin film is irradiated with light, being able to quickly decompose and remove various organic compounds including malodorous substances, harmful substances in the air, environment-polluting organic solvents and agricultural pesticides dissolved in water, and by being able to maintain this effect on a maintenance-free basis.

DESCRIPTION OF THE PREFERRED EMBODIMENTS

The ceramic sol used in this invention is prepared by suspending an ultrafine ceramic powder in water, or by hydrolyzing a metal alkoxide obtained as by the reaction of an alcohol with a metal salt or a metal, or by hydrolyzing a metal salt dissolved in a metal alkoxide. In this case, a uniform and transparent sol is obtained by the addition of an alcohol amine such as monoethanol amine, diethanol amine, triethanol amine, N-methyldiethanol amine, N-ethyldiethanol amine, N,N-dimethyl aminoethanol, or diisopropanol amine and a glycol such as diethylene glycol. A porous ceramic thin film excelling in durability can be produced by using this ceramic sol.

The alkoxide of any metal can conceivably be adopted as the metal alkoxide for the preparation of the ceramic sol used in this invention. In particular, the alkoxides of Al, B, Ba, Ca, Cd, Ce, Co, Cr, Cu, Fe, Ge, Hf, In, Li, Mg, Mn, Mo, Nb, Ni, P, Pb, Ru, Si, Sn, Sr, Ta, Ti, V, W, Y, and Zr and mixtures thereof are desirable metal alkoxides. As metal salts usable for preparing the ceramic sol, there can be mentioned such organic acid salts as acetates, oxalates, ethylhexanoates, stearates, lactates, and acetylacetates of the metals mentioned above.

Titanium is of course used in the production of a thin film of titania as a photocatalyst. As the titanium source, such titanium salts as titanium tetrachloride, titanium sulfate, and titanium acetate can be used.

The porous ceramic thin film of this invention is obtained by adding polyethylene glycol or polyethylene oxide to the ceramic sol prepared as described above, coating a substrate with the resultant mixture by the dip coating method, spin coating method, brush method, or spraying method, and then heating and firing the coated substrate. The firing is preferably carried out by gradually elevating the temperature from normal room temperature. For obtaining a porous ceramic thin film which is sturdy and excellent in durability, it is desirable to produce a multilayer film by repeating a procedure which comprises depositing thinly and uniformly the ceramic sol incorporating polyethylene glycol or polyethylene oxide on a substrate by any of various methods of coating such as brush coating, spraying, spin coating, or dip coating thereby forming a thin film of the solution on the substrate and heating and firing the coated substrate. As a result, a sturdy porous ceramic thin film excellent in durability can be obtained. In this case, a porous thin film of a compound oxide can be produced with what is obtained by mixing alkoxides of two or more kinds of metal and hydrolyzing the resultant mixture or dissolving a metal salt in an alkoxide of metal and hydrolyzing the resultant solution. A film composed of a multiplicity of layers of different ceramic substances can be easily produced by preparing two or more different kinds of sol and alternately or sequentially depositing the sol on a substrate.

In the production of a thin film of titania as an ideal photocatalyst, the firing temperature, namely the final temperature in the aforementioned gradual elevation of temperature from normal room temperature, is preferably in the range of from 600° C. to 700° C. By this firing treatment, the titania sol deposited as a coating on the substrate is converted into a thin film of titanium oxide possessing a crystal form of anatase and exhibiting a high quality as a photocatalyst. If the firing treatment is directly started from a temperature in the range of from 600° C. to 700° C. or if the firing temperature is lower than 600° C. or higher than 700° C. the produced thin film of titanium oxide will be adulterated with rutile or amorphous titanium oxide which is deficient in photocatalytic activity.

The polyethylene glycol or polyethylene oxide added to the ceramic sol for use in this invention should have a molecular weight of not less than 1,000. Particularly, the molecular weight is desirably 1,000, 1,500, 2,000, 3,000, 6,000, 8,000, 11,000, 13,000, 20,000, 100,000, 300,000, 2,000,000, or 2,500,000, for example. If the molecular weight is less than 1,000, the porous ceramic thin film will easily peel off the substrate and will not acquire good appearance or high sturdiness.

The amount of polyethylene glycol or polyethylene oxide added to the ceramic sol for use in this invention is preferably not more than the solubility thereof in the sol. If the amount exceeds the solubility, the micropores formed in the film will not be uniform in diameter and the film will not have a good appearance.

The diameter of the micropores formed in the surface of the porous ceramic thin film of this invention and the distribution density of the micropores can be adjusted by changing the amount of addition of polyethylene glycol or polyethylene oxide or the molecular weight thereof. The produced porous ceramic thin film will contain relatively small micropores of uniform diameter when the amount of the added compound is decreased or the compound added has a small molecular weight and relatively large micropores of uniform diameter when the amount of the added compound is increased or the compound added has a large molecular weight. The diameter of the micropores is in the range of from 1 nm to 2 $\mu$m in practical use. The density at which the micropores are distributed in the porous ceramic thin film increases in proportion as the amount of the compound added increases. If the polyethylene glycol or polyethylene oxide has a wide molecular weight distribution, the porous ceramic thin film will contain micropores of widely varying diameters. A thin film of three-dimensional structure can be produced by overlaying a plurality of such thin films. The thin film of this structure is suitable for special uses such as, for example, catalysts.

The substrate used in the production of the porous ceramic thin film of this invention is only required to be capable of withstanding the firing temperature and, therefore, may be suitably selected from among glass, ceramic material, concrete, and metals. The form of the substrate is not critical for this invention. It may be suitably selected from among plates, tubes, angular columns, cones, spheres, gourds, and ellipsoids. The substrate may be in a closed form or may be provided with a lid. It may be in the form of a circular tube or an angular tube or in the form of fibers. Otherwise, it may be in the form of hollow spheres such as, for example, microballoons.

The case in which the porous thin film of the present invention is a thin film of titanium oxide and is used as a photocatalyst will now be described. In order to further increase the performance of this thin film as a photocatalyst, it may be coated with a metallic film such as of platinum, rhodium, ruthenium, palladium, silver, copper, iron, or zinc. As means for coating the surface of the thin film with the metallic film, the photoelectrodeposition method, the CVD method, and such PVD methods as sputtering and vacuum evaporation may be used. If the metallic film has an unduly large thickness, it will prove to be costly and will not permit easy passage of light to the underlying thin film of titanium oxide. Thus, the metallic film is desired to have as small a thickness as permissible.

Owing to the porosity of its texture, the photocatalyst of porous thin film of titanium oxide according to this invention adsorbs malodorous substances and such harmful substances in the air as $NO_x$ and $SO_x$. It also adsorbs environment-polluting organic compounds dissolved in water such as organic solvents and agricultural pesticides. Moreover, electrons and positive holes are generated in the thin film of titanium oxide when it is exposed to sunlight or artificial light from a fluorescent lamp, an incandescent lamp, a black light, a UV lamp, a mercury lamp, a xenon lamp, a halogen lamp or a metal halide lamp, and the oxidizing-reducing activity of the electrons and positive holes quickly and continuously decomposes and removes the adsorbate. Since this photocatalyst simply requires exposure to light, it operates inexpensively, consumes little energy, and does not require maintenance. When this film of titanium oxide is coated with a metallic film such as of platinum, rhodium, ruthenium, palladium, silver, copper, iron, or zinc, its performance in decomposing and removing the adsorbed organic compounds by catalytic activity is further enhanced. In this case, since the thin film of titanium oxide is porous, the metal disperses smoothly in the thin film and coats the photocatalyst. As a result, the metal is able to manifest its catalytic activity with particularly high effect.

The invention will now be described specifically with reference to working examples.

EXAMPLE 1

A transparent sol was prepared by diluting 0.1 mol of titanium tetraisopropoxide with 200 ml of absolute alcohol, adding 0.1 mol of diethanol amine and 0.1 mol of water to the diluted solution with stirring, and further adding thereto 2 g of polyethylene glycol having a molecular weight of 2,000. The surface of a quartz glass sheet measuring 2 cm per side and having a thickness of 1 mm was coated with the sol by the dip coating method. To be more specific, a titania film 400 nm in thickness was formed on the entire peripheral surface of the quartz glass sheet by a total of ten repetitions of a procedure which comprised dipping the quartz glass sheet in the sol, extracting it therefrom, drying it, and then firing the dried quartz glass sheet. When the surface of the titania film thus obtained was observed under an electron microscope, it was found to have micropores measuring about 20 nm in diameter throughout the entire area thereof.

EXAMPLE 2

A transparent sol was prepared by diluting 0.12 mol of aluminum triisopropoxide with 200 ml of isopropanol, adding 0.12 mol of triethanol amine and 1 mol of water to the diluted solution with stirring, and further adding thereto 2.5 g of polyethylene glycol having a molecular weight of 1,000. By the same dip coating method as used in Example 1, a porous thin film of alumina 500 nm in thickness was formed on the entire peripheral surface of a 2 cm×2 cm×1 mm quartz glass sheet by a total of 12 repetitions of a procedure which comprised coating the surface of the quartz glass plate with the sol. When the surface of the film thus obtained was observed under an electron microscope, it was found to have about 10 nm micropores throughout the entire area thereof.

EXAMPLE 3

A transparent sol was prepared by diluting 0.2 mol of zirconium tetra-n-butoxide with 500 ml of absolute alcohol, adding 0.4 mol of diethylene glycol and 0.4 mol of water to the diluted solution with stirring, and further adding thereto 0.4 g of polyethylene glycol having a molecular weight of 20,000. By the same dip coating method as used in Example 1, a porous thin film of zirconia 300 nm in thickness was formed on the peripheral surface of a 2 cm×2 cm×1 mm quartz glass sheet by a total of 7 repetitions of a procedure which comprised coating the surface of the quartz glass plate with the sol. When the surface of the film thus obtained was observed under an electron microscope, it was found to have about 350 nm micropores throughout the entire area thereof.

EXAMPLE 4

A transparent sol was prepared by adding 0.1 mol of titanium tetraisopropoxide and 0.1 mol of zirconium tetra-n-butoxide to 500 ml of isopropanol, adding 0.4 mol of diisopropanol amine and 0.4 mol of water to the obtained solution, and further adding thereto 4 g of polyethylene glycol having a molecular weight of 3,000. By the same dip coating method as used in Example 1, a porous thin film of zirconium titanate 400 nm in thickness was formed on the peripheral surface of a 2 cm×2 cm×1 mm quartz glass sheet by a total of 10 repetitions of a procedure which comprised coating the surface of the quartz glass plate with the sol. When the surface of the film thus obtained was observed under an electron microscope, it was found to have about 30 nm micropores throughout the entire area thereof.

EXAMPLE 5

A transparent sol was prepared by adding 0.1 mol of titanium tetraisopropoxide and 0.1 mol of lead acetate trihydrate to 250 ml of isopropanol, adding 0.2 mol of diethanol amine and 0.6 mol of water to the obtained solution, and further adding thereto 1.6 g of polyethylene glycol having a molecular weight of 2,000. By the same dip coating method as used in Example 1, a porous thin film of lead titanate 600 nm in thickness was formed on the peripheral surface of a 2 cm×2 cm×1 mm quartz glass sheet by a total of 10 repetitions of a procedure which comprised coating the surface of the quartz glass plate with the sol. When the surface of the film thus obtained was observed under an electron microscope, it was found to have about 10 nm micropores throughout the entire area thereof.

EXAMPLE 6

A transparent sol was prepared by diluting 0.2 mol of niobium pentaethoxide with 500 ml of absolute ethanol, adding 0.4 mol of N-ethyl diethanol amine and 0.4 mol of water to the diluted solution with stirring, and further adding thereto 0.2 g of polyethylene oxide having a molecular weight of 100,000. By the same dip coating method as used in Example 1, a porous thin film of niobium oxide 400 nm in thickness was formed on the peripheral surface of a 2 cm×2 cm×1 mm quartz glass sheet by a total of 9 repetitions of a procedure which comprised coating the surface of the quartz glass plate with the sol. When the surface of the film thus obtained was observed under an electron microscope, it was found to have about 500 nm micropores throughout the entire area thereof.

EXAMPLE 7

A transparent sol was prepared by adding 0.1 mol of zirconium tetra-n-butoxide and 0.1 mol of lead acetatetrihydrate to 500 ml of isopropanol, adding 0.2 mol of diethanol amine and 0.6 mol of water to the obtained solution with stirring, and further adding thereto 0.1 g of polyethylene oxide having a molecular weight of 2,000,000. By the same dip coating method as used in Example 1, a porous thin film of lead zirconate 800 nm in thickness was formed on the peripheral surface of a 2 cm×2 cm×1 mm quartz glass sheet by a total of 20 repetitions of a procedure which comprised coating the surface of the quartz glass plate with the sol.

When the surface of the film thus obtained was observed under an electron microscope, it was found to have about 1,100 nm micropores throughout the entire area thereof.

EXAMPLE 8

A transparent sol was prepared by adding 0.1 mol of titanium tetraisopropoxide, 0.1 mol of zirconium tetranbutoxide, and 0.2 mol of lead acetate trihydrate to 500 ml of isopropanol with stirring, adding 0.4 mol of diethanol amine and 1.2 mol of water to the obtained solution, and further adding thereto 0.2 g of polyethylene oxide having a molecular weight of 200,000. By the same dip coating method as used in Example 1, a porous thin film of lead titanate-zirconate 600 nm in thickness was formed on the peripheral surface of a 2 cm×2 cm×1 mm quartz glass sheet by a total of 15 repetitions of a procedure which comprised coating the surface of the quartz glass plate with the sol. When the surface of the film thus obtained was observed under an electron microscope, it was found to have about 800 nm micropores throughout the entire area thereof.

EXAMPLE 9

A transparent sol was prepared by diluting 45 g of titanium tetraisopropoxide with 400 ml of absolute ethanol, adding 15 g of triethanol amine and 4 g of water to the diluted solution with stirring, and further adding thereto 4 g of polyethylene glycol having a molecular weight of 1,500. The surface of a 7 cm×7 cm×1 mm quartz glass sheet was coated with a titanium oxide film by the dip coating method. To be more specific, a film of titanium oxide 0.5 $\mu$m in thickness was formed on the peripheral surface of the quartz glass sheet by a total of 12 repetitions of a procedure which comprised immersing the quartz glass sheet in the sol, extracting it therefrom, drying it, and then firing the coated quartz glass sheet by gradual elevation of temperature from normal room temperature to 640° C. When the film of titanium oxide thus obtained was tested for crystal structure by X-ray diffraction, it was found to consist of 100% anatase. When the surface of this film was observed under an electron microscope, it was found to have about 20 nm micropores throughout the entire area thereof. This porous thin film of titanium oxide was used as a catalyst for decomposing and removing a malodorous substance. The porous thin film of titanium oxide was placed in a tightly closed container having an inner volume of 30 liters and equipped with a commecially available 100-W black-light lamp, and was directed to face the black-light lamp. Using an injector, 80 ppm of trimethyl amine was introduced into the container as a malodorous substance. The black-light lamp was then turned on. One hour later, the air in the closed container was analyzed by gas chromatography to determine the trimethyl amine concentration. The concentration was found to have decreased to 5 ppm. In a comparative experiment carried out by repeating the same procedure while omitting the use of the thin film of titanium oxide, the concentration of trimethyl amine decreased only to 73 ppm. These results clearly indicate that the porous thin film of titanium oxide functions as a photocatalyst for the removal of a malodorous substance.

EXAMPLE 10

A transparent sol was prepared by diluting 60 g of titanium tetraisopropoxide with 500 ml of absolute alcohol, adding 20 g of diethanol amine and 5 g of water to the diluted solution with stirring, and further adding thereto 5 g of polyethylene glycol having a molecular weight of 1,000. The surface of an 8 cm×8 cm×1 mm quartz glass sheet was coated with a titanium oxide film by the dip coating method. To be more specific, a film of titanium oxide 0.4 $\mu$m in thickness was formed on the peripheral surface of the quartz glass sheet by a total of 9 repetitions of a procedure which comprised immersing the quartz glass sheet in the sol, extracting it therefrom, drying it, and then firing the coated quartz glass sheet by gradual elevation of temperature from normal room temperature to 680° C. When the film of titanium oxide thus obtained was tested for crystal structure by X-ray diffraction, it was found to consist of 100% anatase. When the surface of this film was observed under an electron microscope, it was found to have about 10 nm micropores throughout the entire area thereof. This porous thin film of titanium oxide was used for decomposing and removing $NO_x$. The porous thin film of titanium oxide was placed in a tightly closed container having an inner volume of 40 liters and equipped with a commercially available 100-W incandescent lamp and was directed to face the incandescent lamp. Using an injector, 200 ppm of $NO_x$ was introduced into the container. The incandescent lamp was then turned on. Two hours later, the air in the closed container was analyzed by gas chromatography to determine the $NO_x$ concentration. The concentration was found to have decreased to 10 ppm. In a comparative experiment carried out by repeating the same procedure while omitting the use of the thin film of titanium oxide, the concentration of $NO_x$ decreased only to 187 ppm. These results clearly indicate that the porous thin film of titanium oxide functions as a photocatalyst for the removal of $NO_x$.

EXAMPLE 11

A transparent sol was prepared by diluting 30 g of titanium tetraisopropoxide with 200 ml of isopropanol, adding 10 g of diisopropanol amine and 2 g of water to the diluted solution with stirring, and further adding thereto 0.4 g of polyethylene glycol having a molecular weight of 20,000. The surface of a quartz glass tube measuring 8 mm in diameter, 60 mm in length, and 1 mm in wall thickness was coated with a film of titanium oxide by the dip coating method. To be more specific, a film of titanium oxide 0.3 $\mu$m in thickness was formed on the peripheral surface of the quartz glass tube by a total of 7 repetitions of a procedure which comprised immersing the quartz glass tube in the sol, extracting it therefrom, drying it, and then firing the coated quartz glass tube by gradual elevation of temperature from normal room temperature to 630° C. When the film of titanium oxide thus obtained was tested for crystal structure by an X-ray diffraction, it was found to consist of 100% anatase. When the surface of this film was observed under an electron microscope, it was found to have about 350 nm micropores throughout the entire area thereof. This porous thin film of titanium oxide was used for decomposing tetrachloroethylene, which is currently used widely as a solvent and a detergent in high-tech industries and the cleaning industry and is posing a serious problem by polluting underground water and the soil. In a test tube made of hard glass, 18 ml of an aqueous solution containing tetrachloroethylene at a concentration of 100 ppm was placed, the porous thin film of titanium oxide mentioned above was immersed in the aqueous solution, oxygen was bubbled through the aqueous solution, and the aqueous solution was irradiated with the light from a 300-W xenon lamp for 45 minutes. The resultant reaction solution was analyzed by gas chromatography to determine the amount of tetrachloroethylene contained therein. The tetrachloroethylene concentration in the solution was consequently found to have been decreased by 96%. In a comparative experiment carried out by repeating the same procedure while omitting the use of the porous thin film of titanium oxide, the amount of tetrachloroethylene contained in the reaction solution showed virtually no decrease. These results clearly indicate that the porous thin film of titanium oxide functions as a photocatalyst for the decomposition of tetrachloroethylene.

EXAMPLE 12

A transparent sol was prepared by diluting 25 g of titanium tetraethoxide with 200 ml of methanol, adding 8 g of N-methyl diethanol amine and 2 g of water to the diluted solution with stirring, and further adding thereto 0.1 g of polyethylene oxide having a molecular weight of 100,000. The surface of a quartz glass tube measuring 10 mm in diameter, 60 mm in length, and 1 mm in wall thickness was coated with a film of titanium oxide by the dip coating method. To be more specific, a film of titanium oxide 0.5 $\mu$m in thickness was formed on the peripheral surface of the quartz glass tube by a total of 13 repetitions of a procedure which comprised immersing the quartz glass tube in the sol, extracting it therefrom, drying it, and then firing the coated quartz glass tube by gradual elevation of temperature from normal room temperature to 670° C. When the film of titanium oxide thus obtained was tested for crystal structure by X-ray diffraction, it was found to consist of 100% anatase. When the surface of this film was observed under an electron microscope, it was found to have about 600 nm micropores throughout the entire area thereof. This porous thin film of titanium oxide was used for decomposing trichloroethylene, which is currently used widely as a solvent and a detergent in high-tech industries and the cleaning industry and is posing a serious problem by polluting underground water and the soil. In a test tube made of hard glass, 18 ml of an aqueous solution containing trichloroethylene at a concentration of 500 ppm was placed, the porous thin film of titanium oxide mentioned above was immersed in the aqueous solution, oxygen was bubbled through the aqueous solution, and the aqueous solution was irradiated with the light from a 500-W high-pressure mercury lamp for 15 minutes. The resultant reaction solution was analyzed by gas chromatography to determine the amount of trichloroethylene contained therein. The trichloroethylene concentration in the solution was consequently found to have been decreased by 99%. In a comparative experiment carried out by repeating the same procedure while omitting the use of the porous thin film of titanium oxide, the amount of trichloroethylene contained in the reaction solution showed virtually no decrease. These results clearly indicate that the porous thin film of titanium oxide functions as a photocatalyst for the decomposition of trichloroethylene.

EXAMPLE 13

A transparent sol was prepared by diluting 14 g of titanium tetraisopropoxide with 100 ml of absolute alcohol, adding 5 g of N-ethyl diethanol amine and 1 g of water to the diluted solution with stirring, and further adding thereto 1 g of polyethylene glycol having a molecular weight of 2,000. The surface of a 7 cm×2 cm×1 mm quartz glass sheet was coated with a film of titanium oxide by the dip coating method. To be more specific, a film of titanium oxide 0.4 $\mu$m in thickness was formed on the peripheral surface of the quartz glass sheet by a total of 10 repetitions of a procedure which comprised immersing the quartz glass sheet in the sol, extracting it therefrom, drying it, and then firing the coated quartz glass tube by gradual elevation of temperature from normal room temperature to 650° C. When the film of titanium oxide thus obtained was tested for crystal structure by an X-ray diffraction, it was found to consist of 100% anatase. When the surface of this film was observed under an electron microscope, it was found to have about 50 nm micropores in size throughout the entire area thereof. This porous thin film of titanium oxide was used for decomposing acetic acid. In a quartz cell 20 mm in width, 30 in length, and 3 mm in thickness, 1 ml of an aqueous solution containing acetic acid at a concentration of 120 ppm was placed, the thin film of titanium oxide mentioned above was immersed in the aqueous solution, oxygen was bubbled through the aqueous solution, and the aqueous solution was irradiated with the light from a 100-W mercury lamp for 30 minutes. The resultant reaction solution was analyzed by gas chromatography to determine the amount of acetic acid contained therein. The acetic acid concentration in the solution was consequently found to have been decreased by 85%. In a comparative experiment carried out by repeating the same procedure while omitting the use of the porous thin film of titanium oxide, the amount of acetic acid contained in the reaction solution showed virtually no decrease. These results clearly indicate that the porous thin film of titanium oxide functions as a photocatalyst for the decomposition of acetic acid.

EXAMPLE 14

A transparent sol was prepared by diluting 20 g of titanium tetrabutoxide with 150 ml of t-butyl alcohol, adding 7 g of triethanol amine and 1.5 g of water to the diluted solution with stirring, and further adding thereto 0.1 g of polyethylene oxide having a molecular weight of 2,000,000. The surface of a 20 mm×20 mm×1 mm quartz glass sheet was coated with a film of titanium oxide by the dip coating method. To be more specific, a film of titanium oxide 0.8 $\mu$m in thickness was formed on the peripheral surface of the quartz glass sheet by a total of 20 repetitions of a procedure which comprised immersing the quartz glass sheet in the sol, extracting it therefrom, drying it, and then firing the coated quartz glass tube by gradual elevation of temperature from normal room temperature to 690° C. When the film of titanium oxide thus obtained was tested for crystal structure by an X-ray diffraction, it was found to consist of 100% anatase. When the surface of this film was observed under an electron microscope, it was found to have about 1200 nm micropores throughout the entire area thereof. This film of titanium oxide was immersed in an aqueous ethanol solution containing potassium chloroplatinate at a concentration of 2 g/liter and the aqueous solution was stirred with a magnetic stirrer and meanwhile irradiated with the light from a 100-W mercury lamp for one hour to coat the surface of the film of titanium oxide with platinum by photoelectrodeposition. The porous thin film of titanium oxide with the platinum coating film was used for decomposing 4-nitrophenylethylphenyl phosphinite, an organic phosphorus type agricultural pesticide. In a quartz beaker having an inner volume of 300 ml, 200 ml of an aqueous solution containing 4-nitrophenylethylphenyl phosphinite at a concentration of 1,000 ppm was placed, the thin film of titanium oxide with the platinum coating film was immersed, oxygen gas was bubbled through the aqueous solution, and the aqueous solution was irradiated with the light from a 200-W mercury lamp for 20 minutes. The resultant reaction solution was analyzed by gas chromatography to determine the amount of 4-nitrophenylethylphenyl phosphinite contained therein. The concentration in the solution was consequently found to have been decreased to 5% of the original amount.

In a comparative experiment carried out by repeating the same procedure while omitting the use of the porous thin film of titanium oxide with the platinum coating film, the amount of 4-nitrophenylethylphenyl phosphinite contained in the reaction solution showed virtually no decrease. These results clearly indicate that the porous thin film of titanium oxide provided with the platinum coating film functions as a photocatalyst for the decomposition of 4-nitrophenylethylphenyl phosphinite.

What is claimed is:

1. A method for producing a ceramic film containing micropores of uniform diameter on a substrate, comprising:
    a. hydrolyzing a metal alkoxide in the presence of at least one alcohol amine to produce a ceramic sol, wherein the metal is at least one selected from the group consisting of Al, B, Ba, Ca, Cd, Ce, Co, Cr, Cu, Fe, Ge, Hf, In, Li, Mg, Mn, Mo, Nb, Ni, P, Pb, Ru, Si, Sn, Sr, Ta, Ti, V, W, Y, and Zr;
    b. adding at least one member selected from the group consisting of polyethylene glycol and polyethylene oxide to the ceramic sol;
    c. depositing the resultant ceramic sol on said substrate; and
    d. heating the resultant substrate.

2. The method according to claim 1, wherein said one member selected from the group consisting of polyethylene glycol and polyethylene oxide has a molecular weight of at least 1,000.

3. The method according to claim 1, wherein the content in said ceramic sol of said one member selected from the group consisting of polyethylene glycol and polyethylene oxide is not more than the solubility of said one member in said ceramic sol.

4. The method according to claim 1, wherein the alcohol amine is selected from the group consisting of monoethanolamine, diethanolamine, triethanolamine, N-methyldiethanol amine, N-ethyldiethanol amine, N,N-dimethyl aminoethanol and diisopropanol amine.

5. The method according to claim 1, wherein the metal is Ti.

6. The method according to claim 5, wherein said heating the resultant substrate results in a film of titanium oxide possessing a crystal form of anatase.

7. The method according to claim 1, wherein the ceramic film has a thickness of 300 nm to 800 nm.

8. The method according to claim 1, wherein the ceramic film has a thickness of 300 nm to 800.

9. A method for producing a ceramic film containing micropores of uniform diameter on a substrate, comprising:
    a. hydrolyzing a metal alkoxide in the presence of at least one alcohol amine to produce a ceramic sol;
    b. adding at least one member selected from the group consisting of polyethylene glycol and polyethylene oxide to the ceramic sol;
    c. depositing the resultant ceramic sol on said substrate; and
    d. heating the resultant substrate, wherein said ceramic sol is a titania sol and said heating of said ceramic sol is conducted by elevation of temperature from normal room temperature to a temperature in the range of from 600° C. to 700° C.

10. The method according to claim 9, wherein said one member selected from the group consisting of polyethylene glycol and polyethylene oxide has a molecular we igh t of at least 1,000.

11. The method according to claim 9, wherein the content in said ceramic sol of said one member selected from the group consisting of polyethylene glycol and polyethylene oxide is not more than the solubility of said one member in said ceramic sol.

12. The method according to claim 9, wherein the alcohol amine is selected from the group consisting of monoethanolamine, diethanolamine, triethanolamine, N-methyldiethanol amine, N-ethyldiethanol amine, N,N-dimethyl aminoethanol and diisopropanol amine.

13. The method according to claim 9, wherein said heating the resultant substrate results in a film of titanium oxide possessing a crystal form of anatase.

* * * * *